United States Patent
Vergin et al.

(10) Patent No.: US 11,290,594 B2
(45) Date of Patent: Mar. 29, 2022

(54) CUMULATIVE AVERAGE SPECTRAL ENTROPY ANALYSIS FOR TONE AND SPEECH CLASSIFICATION

(71) Applicant: Genesys Telecommunications Laboratories, Inc., Daly City, CA (US)

(72) Inventors: Rivarol Vergin, Indianapolis, IN (US); Jason Anthony McDowell, Indianapolis, IN (US); Adam M. Paugh, Indianapolis, IN (US)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 0 days.

(21) Appl. No.: 17/363,647

(22) Filed: Jun. 30, 2021

(65) Prior Publication Data

US 2021/0409543 A1  Dec. 30, 2021

Related U.S. Application Data

(60) Provisional application No. 63/045,908, filed on Jun. 30, 2020.

(51) Int. Cl.
*H04M 3/51* (2006.01)
*G10L 25/03* (2013.01)
(Continued)

(52) U.S. Cl.
CPC .......... *H04M 3/5175* (2013.01); *G10L 25/03* (2013.01); *G10L 25/51* (2013.01); *H04M 3/4936* (2013.01); *H04M 3/523* (2013.01)

(58) Field of Classification Search
CPC ......... G10L 13/00; G10L 19/00; G10L 25/78; G10L 21/0216; G10L 25/06; G10L 25/18;
(Continued)

(56) References Cited

U.S. PATENT DOCUMENTS

| 8,280,724 B2 | 10/2012 | Chazan et al. |
| 2006/0159252 A1 | 7/2006 | Chambers et al. |

(Continued)

OTHER PUBLICATIONS

International Search Report and Written Opinion of the International Searching Authority; The International Searching Authority; International Application No. PCT/US2021/039829; dated Oct. 13, 2021; 6 pages.

(Continued)

*Primary Examiner* — Rasha S Al Aubaidi
(74) *Attorney, Agent, or Firm* — Taft Stettinius & Hollister LLP

(57) ABSTRACT

A contact center system for performing call progress analysis including tone and speech classification according to an embodiment includes at least one processor and at least one memory comprising a plurality of instructions stored thereon that, in response to execution by the at least one processor, causes the contact center system to determine a cumulative average of an entropy of an audio signal received by the contact center system, determine a cumulative average power spectral amplitude and a cumulative average spectral entropy of the audio signal, calculate a difference measure of the audio signal as a difference between the cumulative average of the entropy and the cumulative average spectral entropy, distinguish tones from speech of the audio signal based on the difference measure, and process one or more tones of the audio signal in response to identification of the one or more tones in the audio signal.

20 Claims, 9 Drawing Sheets

(51) Int. Cl.
*H04M 3/493* (2006.01)
*H04M 3/523* (2006.01)
*G10L 25/51* (2013.01)

(58) Field of Classification Search
CPC ... G10L 25/64; H04M 3/5191; H04M 3/5233; H04M 3/5158; H04M 7/006; H04L 51/02; H04L 65/1006; H04L 12/66
See application file for complete search history.

(56) References Cited

U.S. PATENT DOCUMENTS

| | | |
|---|---|---|
| 2009/0076814 A1 | 3/2009 | Lee |
| 2010/0189249 A1 | 7/2010 | Shah et al. |
| 2014/0328479 A1 | 11/2014 | Epiktetov |
| 2018/0247662 A1 | 8/2018 | Fan |
| 2020/0402499 A1* | 12/2020 | Angkititrakul ......... G10L 25/84 |

OTHER PUBLICATIONS

Llanos, Fernando et al.; Power spectral entropy as an information-theoretic correlate of manner of articulation in American English; The Journal of the Acoustical Society of America; 2017; 8 pages; vol. 141, No. 2; Acoustical Society of America.

Goertzel, Gerald; An Algorithm for the Evaluation of Finite Trigonometric Series; The American Mathematical Monthly; Jan. 1958; pp. 34-35; vol. 65, No. 1; Mathematical Association of America.

Mock, Pat; Add DTMF Generation and Decoding to DSP-µP Designs; Application Report: SPRA168; 1989; 19 pages; Texas Instruments.

ITU-T; Technical Features of Push-Button Telephone Sets; Blue Book; 1988; 4 pages; International Telecommunication Union.

CCITT; Technical characteristics of tones for the telephone service; Blue Book; 1988; 14 pages; International Telecommunication Union.

ITU-T; Various Tones used in National Networks; Supplement 2; 1994; 34 pages; International Telecommunication Union.

Dubnov, Shlomo; Generalization of Spectral Flatness Measure for Non-Gaussian Linear Processes; Signal Processing Letters; 2004; pp. 698-701; vol. 11, No. 8.

Mackay, David J.C.; Information Theory, Inference, and Learning Algorithms; Mar. 28, 2005; 640 pages; Ver. 7.2; Cambridge University Press.

* cited by examiner

CUMULATIVE AVERAGE SPECTRAL ENTROPY ANALYSIS FOR TONE AND SPEECH CLASSIFICATION

CROSS-REFERENCE TO RELATED APPLICATIONS

This application claims priority to and the benefit of U.S. Provisional Application No. 63/045,908, titled "Cumulative Average Spectral Entropy Analysis for Tone and Speech Classification," filed on Jun. 30, 2020, the contents of which are incorporated herein by reference in their entirety.

BACKGROUND

Call Analysis or Call Progress Analysis (CPA) is a term for a set of signal processing algorithms that operate on an audio signal during call setup, consisting of both tones and speech, in order to determine the outcome of the call. Humans are easily able to listen for and detect various tones (e.g., dial tone before dialing, ring back, busy, answer, etc.). However, for a machine to be able to do the same thing with the same precision requires considerable care in its implementation, especially when human speech in network carrier messages must be differentiated from various tones.

Telephony applications with outbound calling capacity require the ability to accurately and rapidly interpret the call progress tones (e.g., ring back and busy) that are delivered by the network to the calling entity. Although the International Telecommunication Union publishes recommended tone definitions per country, which are largely followed, there remains no consistent, standard set of tone frequencies and patterns used worldwide by all telephony providers to signal a specific event, which complicates Call Progress Analysis. Providers use various approaches in an attempt to detect and identify different tones involved in the process of analyzing the progress of a call. However, most of the signal processing algorithms currently employed tend to perform insufficiently when the audio signal under analysis is degraded by poor transmission networks or otherwise.

SUMMARY

One embodiment is directed to a unique system, components, and methods for cumulative average spectral entropy analysis for tone and speech classification. Other embodiments are directed to apparatuses, systems, devices, hardware, methods, and combinations thereof for cumulative average spectral entropy analysis for tone and speech classification.

According to an embodiment, a contact center system for performing call progress analysis using tone and speech classification may include at least one processor and at least one memory comprising a plurality of instructions stored thereon that, in response to execution by the at least one processor, causes the contact center system to determine a cumulative average of an entropy of an audio signal received by the contact center system, determine a cumulative average power spectral amplitude of the audio signal and a cumulative average spectral entropy of the audio signal based on the cumulative average power spectral amplitude of the audio signal, calculate a difference measure of the audio signal as a difference between the cumulative average of the entropy of the audio signal and the cumulative average spectral entropy of the audio signal, distinguish tones from speech of the audio signal based on the difference measure of the audio signal, and process one or more tones of the audio signal in response to identification of the one or more tones in the audio signal.

In some embodiments, to process the one or more tones of the audio signal may include to identify a call progress tone pattern in the one or more tones of the audio signal and transfer a telephonic call from a first system of the contact center system to a second system of the contact center system in response to identification of the call progress tone pattern in the one or more tones of the audio signal.

In some embodiments, to process the one or more tones of the audio signal may include to connect an outbound call to an automated interactive voice response (IVR) system of the contact center system.

In some embodiments, to process the one or more tones of the audio signal may include to connect an outbound call to an agent of the contact center system.

In some embodiments, the one or more tones of the audio signal may include a call progress tone pattern.

In some embodiments, the call progress tone pattern may be a busy signal pattern, a ring back pattern, or a special information tone pattern.

In some embodiments, to process the one or more tones of the audio signal may include to determine a corresponding frequency of each of the one or more tones of the audio signal.

In some embodiments, to determine the cumulative average of the entropy of the audio signal may include to calculate the entropy of the audio signal.

According to another embodiment, one or more non-transitory machine-readable storage media comprising a plurality of instructions stored thereon that, in response to execution by at least one processor, may cause a contact center system to calculate an entropy of an audio signal received by the contact center system, calculate a cumulative average of the entropy of the audio signal, calculate a cumulative average power spectral amplitude of the audio signal, calculate a cumulative average spectral entropy of the audio signal based on the cumulative average power spectral amplitude of the audio signal, calculate a difference measure of the audio signal as a difference between the cumulative average of the entropy of the audio signal and the cumulative average spectral entropy of the audio signal, classify tones and speech of the audio signal based on the difference measure of the audio signal, and process one or more tones of the audio signal in response to identification of the one or more tones in the audio signal.

In some embodiments, to process the one or more tones of the audio signal may include to transfer a telephonic call from a first system of the contact center system to a second system of the contact center system in response to identification of a call progress tone pattern in the one or more tones of the audio signal.

In some embodiments, to process the one or more tones of the audio signal may include to connect an outbound call to an automated interactive voice response (IVR) system of the contact center system.

In some embodiments, to process the one or more tones of the audio signal may include to connect an outbound call to an agent of the contact center system.

In some embodiments, the one or more tones of the audio signal may include a call progress tone pattern.

In some embodiments, the call progress tone pattern may be a busy signal pattern, a ring back pattern, or a special information tone pattern.

In some embodiments, to process the one or more tones of the audio signal may include to determine a corresponding frequency of each of the one or more tones of the audio signal.

According to yet another embodiment, a method of performing call progress analysis using tone and speech classification in a contact center system may include receiving an audio signal by the contact center system, determining, by the contact center system, an entropy of the audio signal received by the contact center system, determining, by the contact center system, a cumulative average of the entropy of the audio signal, determining, by the contact center system, a cumulative average power spectral amplitude of the audio signal, determining, by the contact center system, a cumulative average spectral entropy of the audio signal based on the cumulative average power spectral amplitude of the audio signal, determining, by the contact center system, a difference measure of the audio signal as a difference between the cumulative average of the entropy of the audio signal and the cumulative average spectral entropy of the audio signal, classifying, by the contact center system, tones and speech of the audio signal based on the difference measure of the audio signal, and processing, by the contact center system, one or more tones of the audio signal in response to identification of the one or more tones in the audio signal.

In some embodiments, processing the one or more tones of the audio signal may include identifying a call progress tone pattern in the one or more tones of the audio signal and transferring a telephonic call from a first system of the contact center system to a second system of the contact center system in response to identifying call progress tone pattern in the one or more tones of the audio signal.

In some embodiments, processing the one or more tones of the audio signal may include connecting an outbound call to one of an agent or an automated interactive voice response (IVR) system of the contact center system.

In some embodiments, the one or more tones of the audio signal may include a call progress tone pattern.

In some embodiments, processing the one or more tones of the audio signal may include determining a corresponding frequency of each of the one or more tones of the audio signal.

This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Figure 1A:
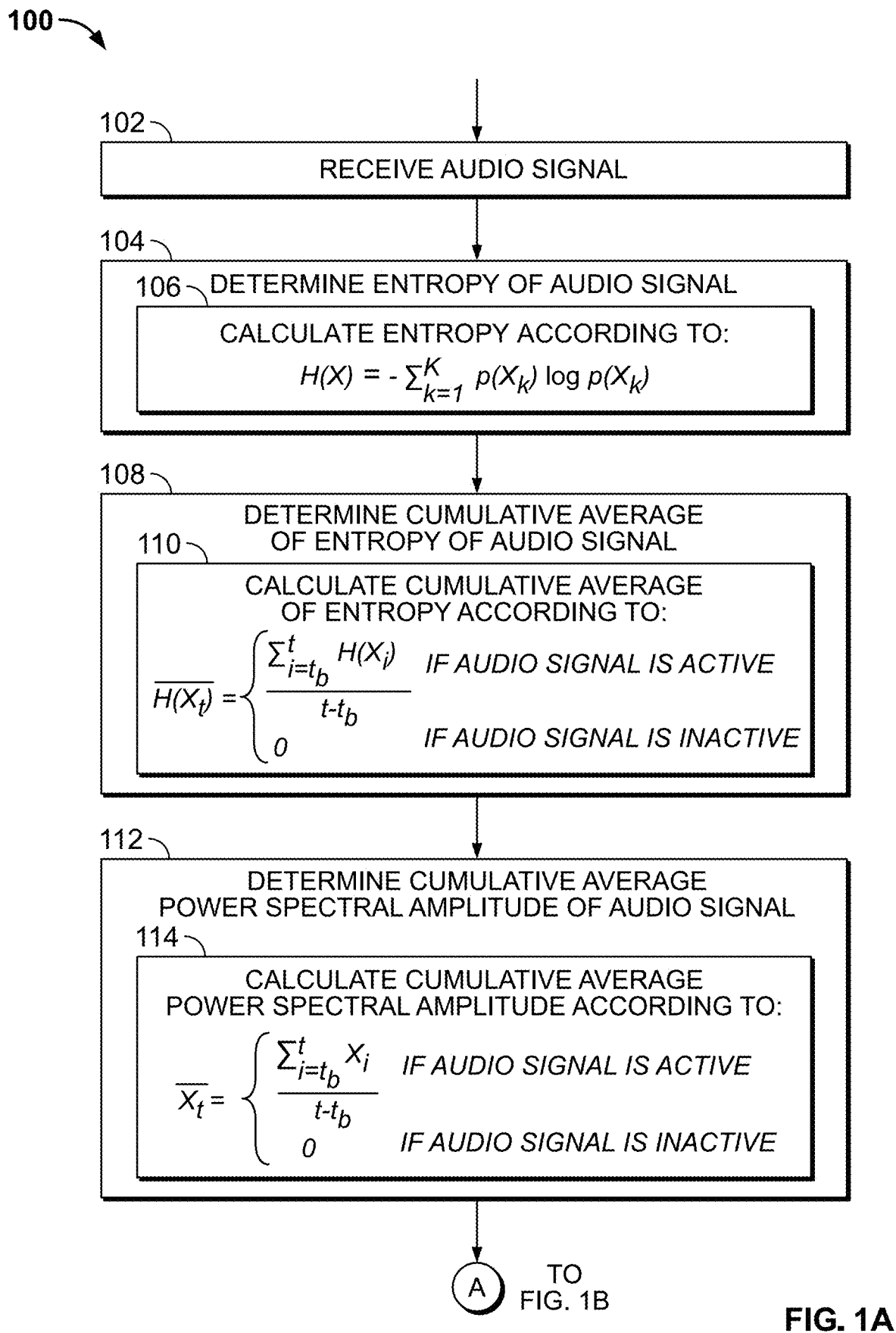
FIGS. 1A-1B depict a simplified flow diagram of at least one embodiment of a method of performing call progress analysis using tone and speech classification.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should be further appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Further, particular features, structures, or characteristics may be combined in any suitable combinations and/or sub-combinations in various embodiments.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Providers use various approaches in an attempt to detect and identify different tones involved in the process of analyzing the progress of a call. For example, in some embodiments, the Goertzel algorithm or the Fast Fourier Transform (FFT) may be used, each of which exhibits different strengths and weaknesses. The detection and identification of the tone is performed simultaneously with the Goertzel algorithm. That is, the algorithm does not simply detect the presence of a tone, but it also identifies which tone is being detected. When the FFT algorithm is used, however, the process is generally separated into two steps. In the first step, a generic tone versus speech classification is performed. In the second step, once it is known that a tone is present, its frequency is identified in order to interpret the outcome of the call. The techniques described herein improve upon the FFT algorithm by incorporating "cumulative average spectral entropy" into the analysis, which makes the process more robust when the audio signal is degraded by poor transmission networks.

Telephony networks are not standardized throughout the world. In Europe, for example, a single tone is primarily used to report events, and the ring back tone in most European countries is 425 Hz. In North America, however, a dual tone is preferred in that a 350-440 Hz dual-tone is used to indicate a ring back. Accordingly, a relatively complicated set up is often required from any telephony provider who would like to offer its services to different countries. The Goertzel algorithm and the FFT algorithm represent two approaches to detect and identify tones.

The Goertzel algorithm is a technique used in digital signal processing (DSP) for efficient evaluation of an individual term in a Discrete Fourier Transform (DFT), and it is used to calculate the kth DFT component of a signal {x(n), n=[0, N]}. The Goertzel algorithm analyzes one selectable frequency component from a discrete signal. Given a known frequency $\omega_0$ specified by:

$$\omega_0 = 2\pi \frac{k}{N},$$

where N is the number of terms in the audio signal sequence (e.g., in general, N=205). The Goertzel algorithm is defined by fundamental equations including a first stage that calculates an intermediate sequence, $s[n]=x[n]+2\cos\omega_0 s[n-1]-s[n-2]$, and a second stage that applies a filter to s[n] to generate the output sequence, $y[n]=s[n]-e^{-j\omega_0}s[n-1]$. The values of s[n] and y[n] are iteratively calculated until n=N.

It should be appreciated that the Goertzel algorithm is relatively simple and works well in most circumstances. However, one important constraint with the Goertzel algorithm is that the specific frequency of interest must be known a priori. The frequency of interest is defined by the index k and is selected from the index numbers k∈{0, 1, 2, ..., N-1}. Assuming a sampling frequency of 8000 Hz, which is common in telephony, the frequency resolution Δf is given by:

$$\Delta f = \frac{f_s}{N}.$$

It should be appreciated that the values $f_s$=8000 and N=205 are often used when the Goertzel algorithm is applied in telephony to analyze some specific frequency band.

In telephony, the Goertzel algorithm may be used to detect Dual-Tone Multi-Frequency (DTMF) signals, where the meaning of the signaling is determined by two out of a total of eight frequencies being simultaneously present. Because eight different frequencies are evaluated simultaneously as shown in Table 1 presented below, the Goertzel algorithm is evaluated eight times for each value of n with a different value of k defining the frequency, $\omega_0$. Although the Goertzel algorithm has a higher order of complexity than the FFT, it remains efficient for computing a small number of selected frequency components.

TABLE 1

List of Tones Used in DTMF Signaling

| Freq. | 1209 Hz | 1336 Hz | 1477 Hz |
|---|---|---|---|
| 697 Hz | 1 | 2 | 3 |
| 770 Hz | 4 | 5 | 6 |
| 852 Hz | 7 | 8 | 9 |
| 941 Hz | * | 0 | # |

Other audible signals used in telephony include call progress tone patterns that indicate the progress or disposition of a telephone call. The busy signal, ring back, and special information tone (SIT) are all examples of such call progress tone patterns. In CPA, there is a need to differentiate between a large set of tones in order to be able to classify the tone patterns. For example, in North America, up to sixteen tone frequencies as shown in Table 2 presented below are used to create different tone patterns, each of which is composed of one or more frequencies that are played at specific intervals. As indicated above, when the FFT is used for CPA, the process is separated into two steps: detecting tone presence and identifying its frequency.

TABLE 2

List of North American Tons Supported by Call Progress Analysis

| Tone ID | Frequency Count | Frequency 0 (Hz) | Frequency 1 (Hz) |
|---|---|---|---|
| 0x00 | 1 | 0 | |
| 0x01 | 2 | 350 | 440 |
| 0x02 | 2 | 440 | 480 |
| 0x03 | 1 | 440 | |
| 0x04 | 1 | 480 | |
| 0x05 | 2 | 480 | 620 |
| 0x06 | 1 | 620 | |
| 0x07 | 1 | 914 | |
| 0x08 | 1 | 985 | |

TABLE 2-continued

List of North American Tons Supported by Call Progress Analysis

| Tone ID | Frequency Count | Frequency 0 (Hz) | Frequency 1 (Hz) |
|---|---|---|---|
| 0x09 | 1 | 1371 | |
| 0x0A | 1 | 1429 | |
| 0x0B | 1 | 1777 | |
| 0x0C | 1 | 2000 | |
| 0x0D | 1 | 1700 | |
| 0x0E | 1 | 2100 | |
| 0x0F | 1 | 425 | |
| 0x10 | 1 | 500 | |
| 0x11 | 1 | 1100 | |
| 0x12 | 1 | 1398 | |
| 0x13 | 1 | 1820 | |

Figure 4:
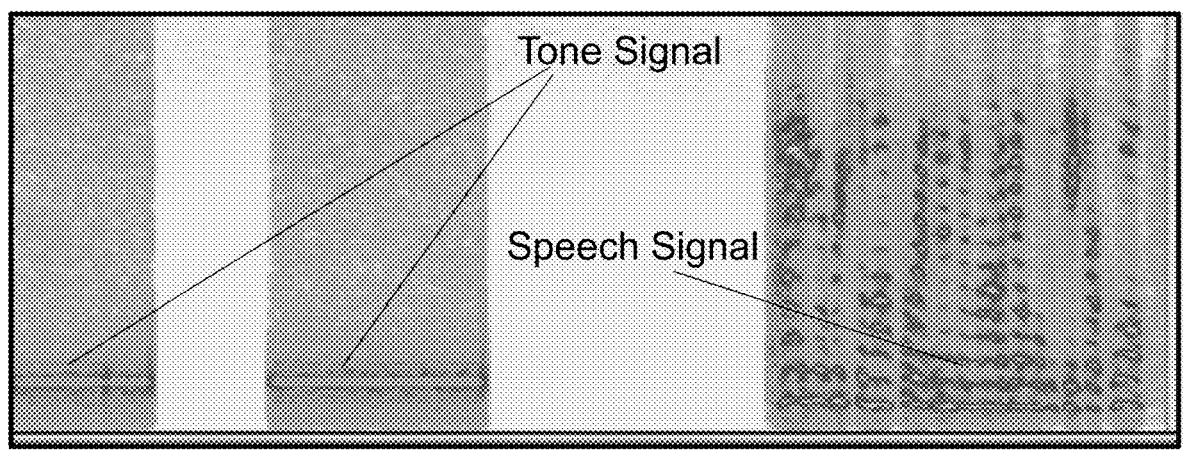
FIG. 4 is a spectrogram of an example audio signal containing both tone and speech signals.

A spectral flatness measure and an entropy measure may be calculated in the frequency domain of an audio signal. As described below, spectral flatness and the entropy measure work relatively well to differentiate between tone and speech. In particular, the audio signal may first be segmented into overlapping frames. For example, in some embodiments, each frame may have a length of 0.03 seconds and weighted by a Hamming window of the same length. The overlapping used may be ⅔ such that the window is advanced by 0.01 seconds at each time step. An FFT of 256 points may be performed over each frame. In some embodiments, for the subsequent analysis, only half of the power spectral amplitude coefficients $X_k$ are retained with the index $k \in [1, 128]$, because the power spectral amplitude is symmetric for real signals. FIG. 4 displays the spectrogram of an example audio signal containing both tone and speech signals.

Spectral flatness or tonality coefficient is a measure used in DSP to characterize an audio spectrum. It provides a way to quantify how tone-like a sound is, as opposed to being noise-like. The spectral flatness measure is calculated by dividing the geometric mean of the power spectrum by the arithmetic mean of the power spectrum according to:

$$\text{flatness} = \frac{\sqrt[K]{\prod_{1}^{K} X_k}}{\frac{\sum_{1}^{K} K_k}{K}}.$$

Figure 5:
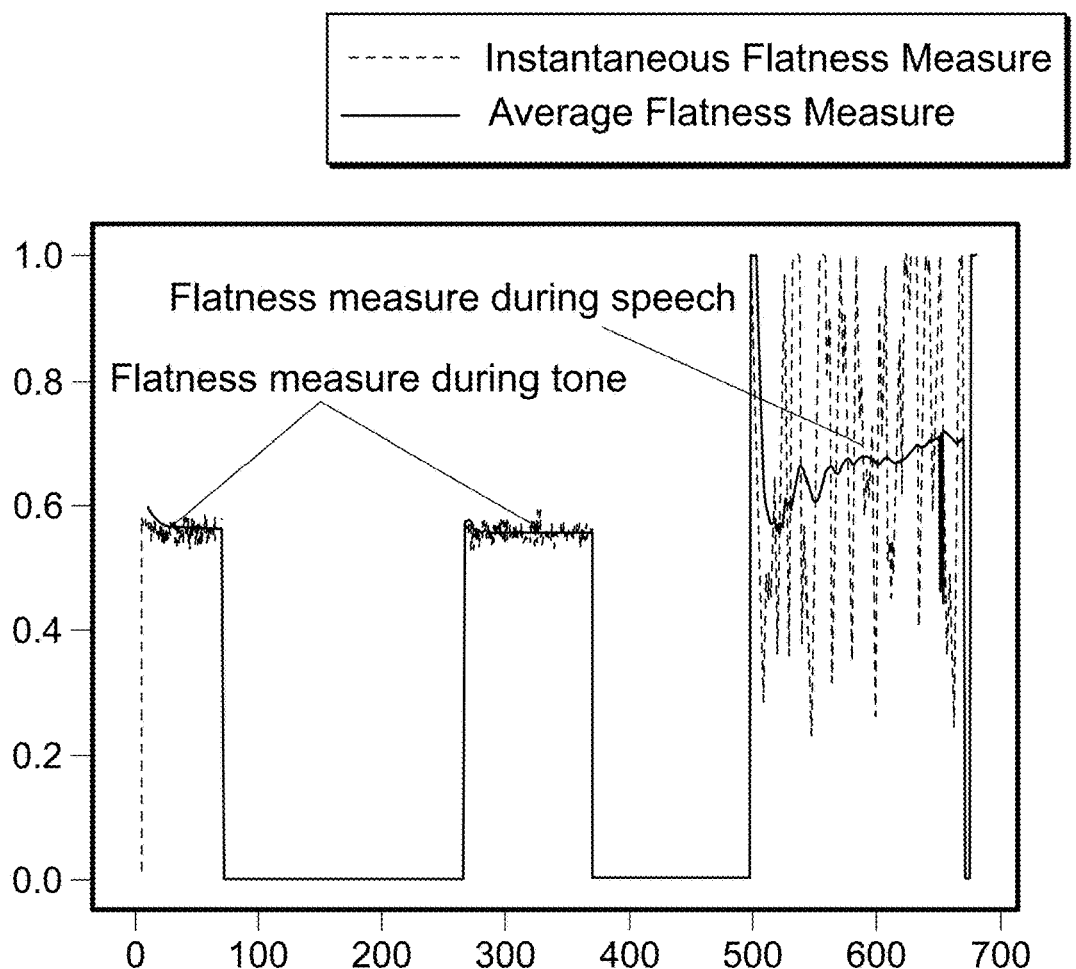
FIG. 5 is a graph of a spectral flatness of an audio signal during tone and speech.

A high flatness value (i.e., with a value close to 1.0) indicates that the spectrum has a similar amount of power in all spectral bands, which is likely noise, whereas a low spectral flatness value indicates that the spectral power is concentrated in a relatively small number of frequency bands. As such, a flatness value close to zero is more likely to be a pure tone. FIG. 5 illustrates an example of spectral flatness during tone and speech.

In some embodiments, entropy may be used as a measure of randomness to differentiate between tone and speech. The definition of entropy can be expressed in terms of a discrete set as:

$$H(X) = -\sum_{k=1}^{K} p(X_k) \log p(X_k).$$

Figure 6:
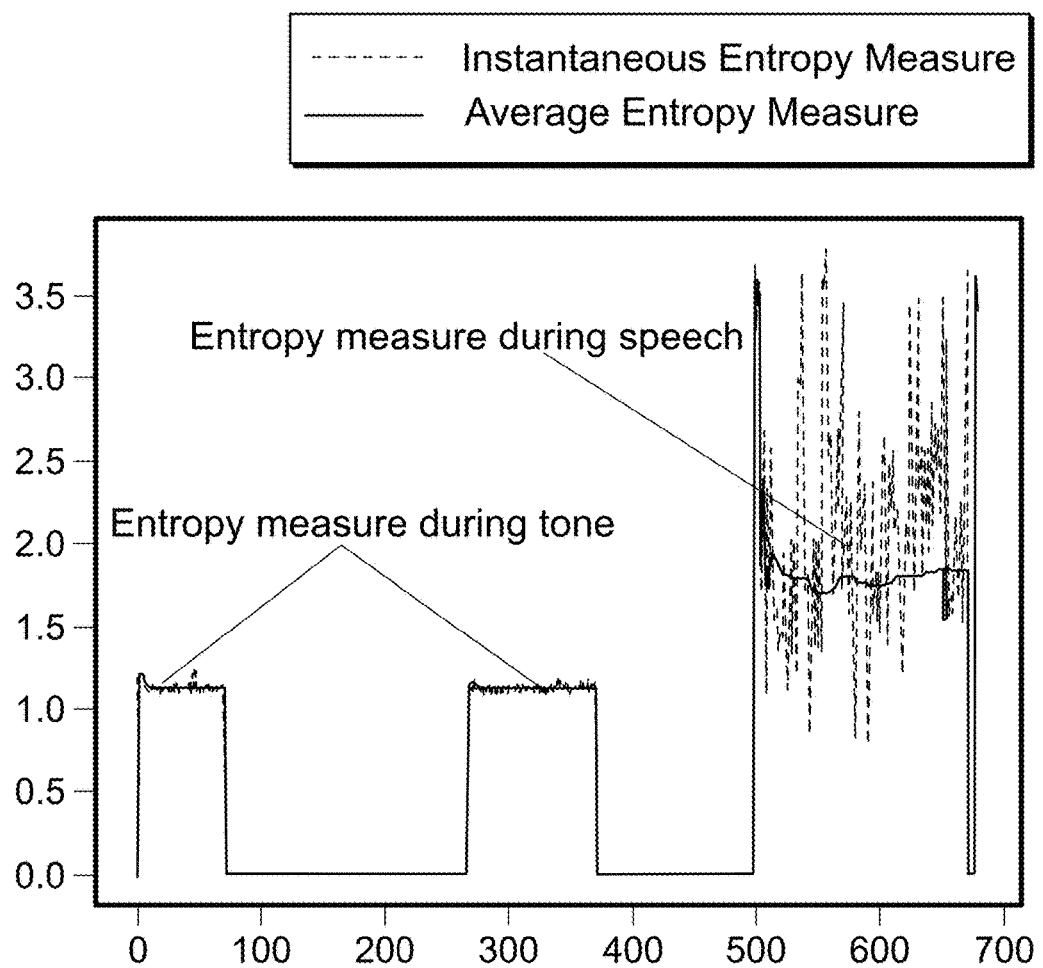
FIG. 6 is a graph of an entropy measure of an audio signal during tone and speech.

Assuming, without loss of generality, that $p_k \log p_k = 0$ for $p_k = 0$ and $p_k = 1$, and replacing the discrete set of probabilities $p_k$ by the normalized power amplitude spectrum, it will be appreciated that the entropy H(X) will have a lower value during tone and a higher value during speech, which is depicted in FIG. 6.

Because the measured values of both flatness and entropy often vary significantly during speech (see FIGS. 5-6), the cumulative average is, in general, preferred over the instantaneous values. For the entropy measure, for example, the cumulative average of the entropy $\overline{H(X)}$ is given by:

$$\overline{H(X_t)} = \begin{cases} \dfrac{\sum_{i=t_b}^{t} H(X_i)}{t - t_b} & \text{if audio signal is active} \\ 0 & \text{if audio signal is inactive} \end{cases},$$

wherein the parameter $t_b$ indicates the starting point of the current block of audio signal. The cumulative average of the entropy is calculated between this point $t_b$, up to the current time t. The entropy and flatness values may be set to zero during silence.

Figure 7:
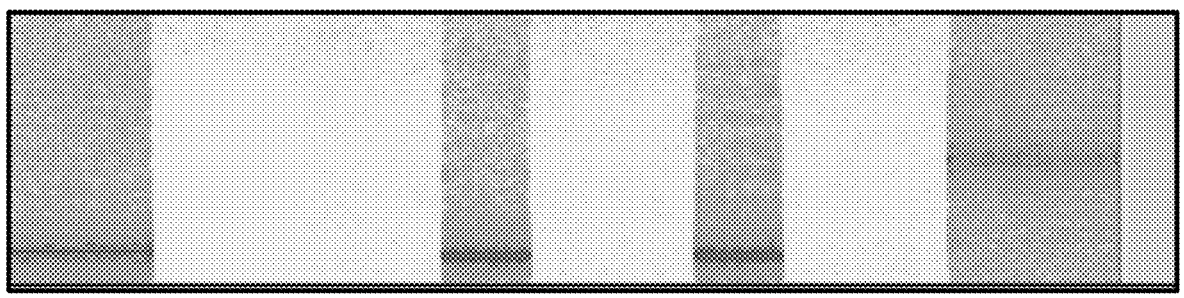
FIG. 7 is a spectrogram of an example poor-quality tone audio signal observed in a call center.
Figure 8:
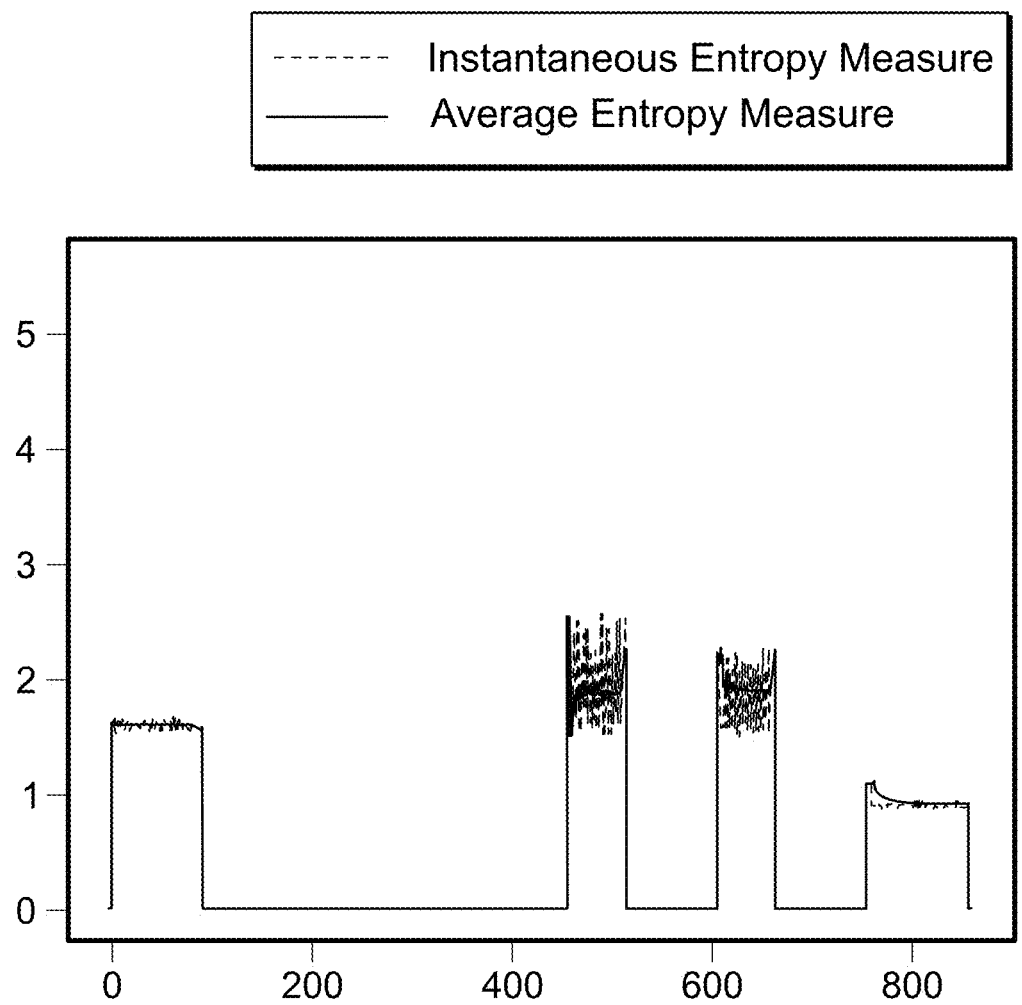
FIG. 8 is a graph of an entropy measure for an audio tone signal.

In many cases, however, the audio quality is poor, for example, due to poor transmission networks, which typically causes the CPA system to underperform. FIG. 7 illustrates an example of a poor-quality tone audio signal observed in a call center, and FIG. 8 depicts the corresponding entropy measures for the audio signal of FIG. 7. Although one would expect each block of tone signal to have the same approximate value, it is clear from FIG. 8 that a poor-quality tone signal may result in each block of tone signal having a different entropy value, thereby making it difficult to find an appropriate threshold to differentiate the tone signals from speech signals. Accordingly, when presented with such poor audio signals, CPA algorithms often struggle to classify the tones properly.

As indicated above, the cumulative average of the entropy measure $\overline{H(X)}$, which may be used to differentiate tone from speech, is given by:

$$\overline{H(X_t)} = \begin{cases} \dfrac{\sum_{i=t_b}^{t} H(X_i)}{t - t_b} & \text{if audio signal is active} \\ 0 & \text{if audio signal is inactive} \end{cases}.$$

However, as described above in reference to FIG. 8, for example, the values given by $\overline{H(X)}$ vary too much during degraded tones to make it useful for tone versus speech classification without improvements.

The improved technologies described herein overcome this problem caused by degraded audio signals by leveraging cumulative average spectral analysis to generate a cumulative average spectral entropy measure for use in distinguishing tones from speech. In the illustrative embodiment, cumulative average power spectral amplitude is defined by $H(\overline{X})$ according to:

$$\overline{X}_t = \begin{cases} \dfrac{\sum_{i=t_b}^{t} X_i}{t-t_b} & \text{if audio signal is active} \\ 0 & \text{if audio signal is inactive} \end{cases}$$

Then, using the cumulative average power spectral amplitude value $\overline{X}_t$, the system calculates the cumulative average spectral entropy measure, $H(\overline{X})$, according to:

$$H(\overline{X}_t) = -\Sigma_{k=1}^{K} p(\overline{X}_{t,k}) \log p(\overline{X}_{t,k}).$$

In essence, the cumulative average power spectral amplitude $\overline{X}_t$ is calculated before evaluating the entropy $H(\overline{X})$ itself. In the illustrative embodiment, the cumulative average power spectral amplitude $\overline{X}_t$ is calculated only when an active audio signal is detected and, otherwise, the value $\overline{X}_t$ is set to zero. The cumulative average power spectral amplitude $\overline{X}_t$ is calculated inside the interval $[t_b, t]$ where t is the current frame index and $t_b$ marks the last position where the audio signal starts being active.

Figure 9:
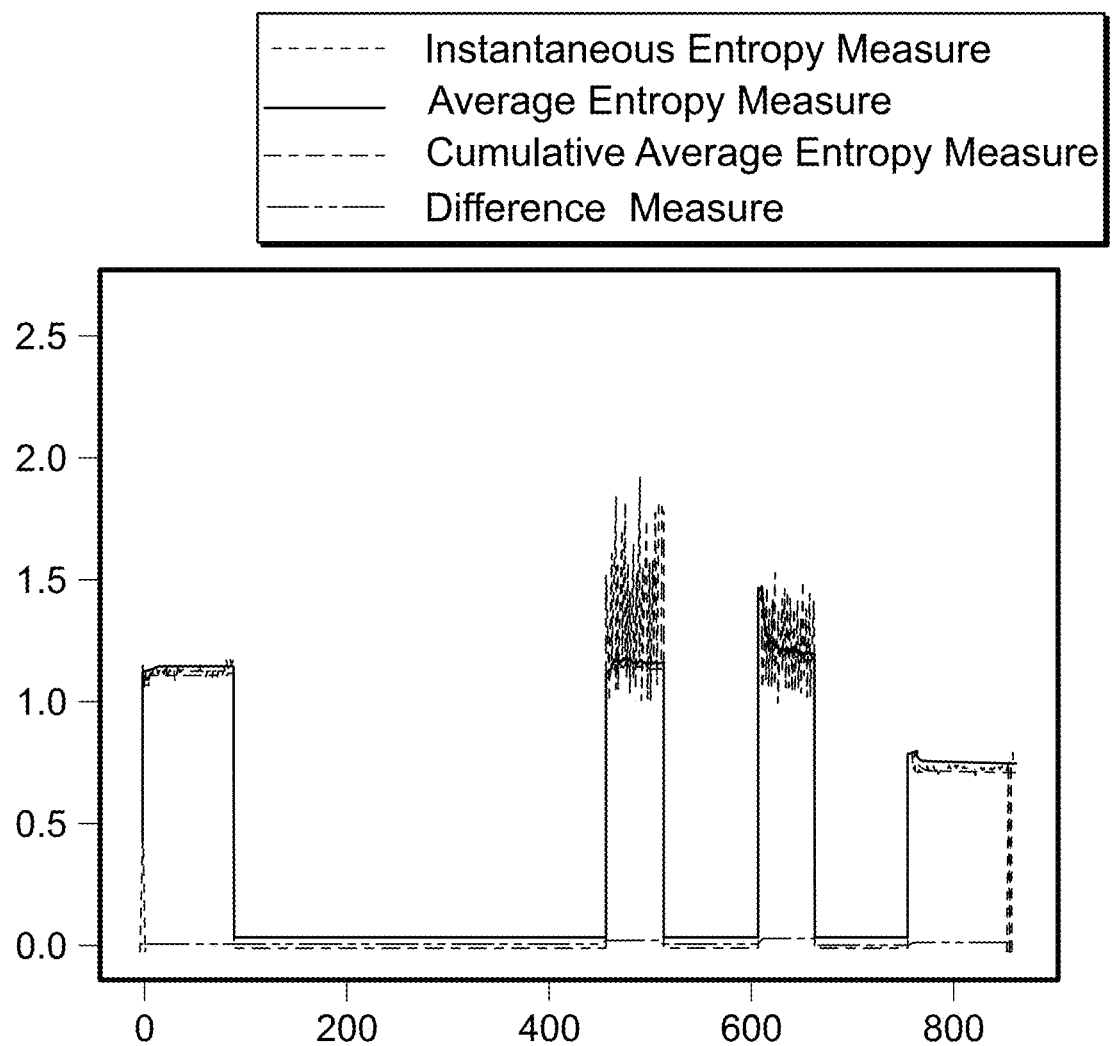
FIG. 9 is a graph of three entropy measures for an audio signal with degraded tones.
Figure 10:
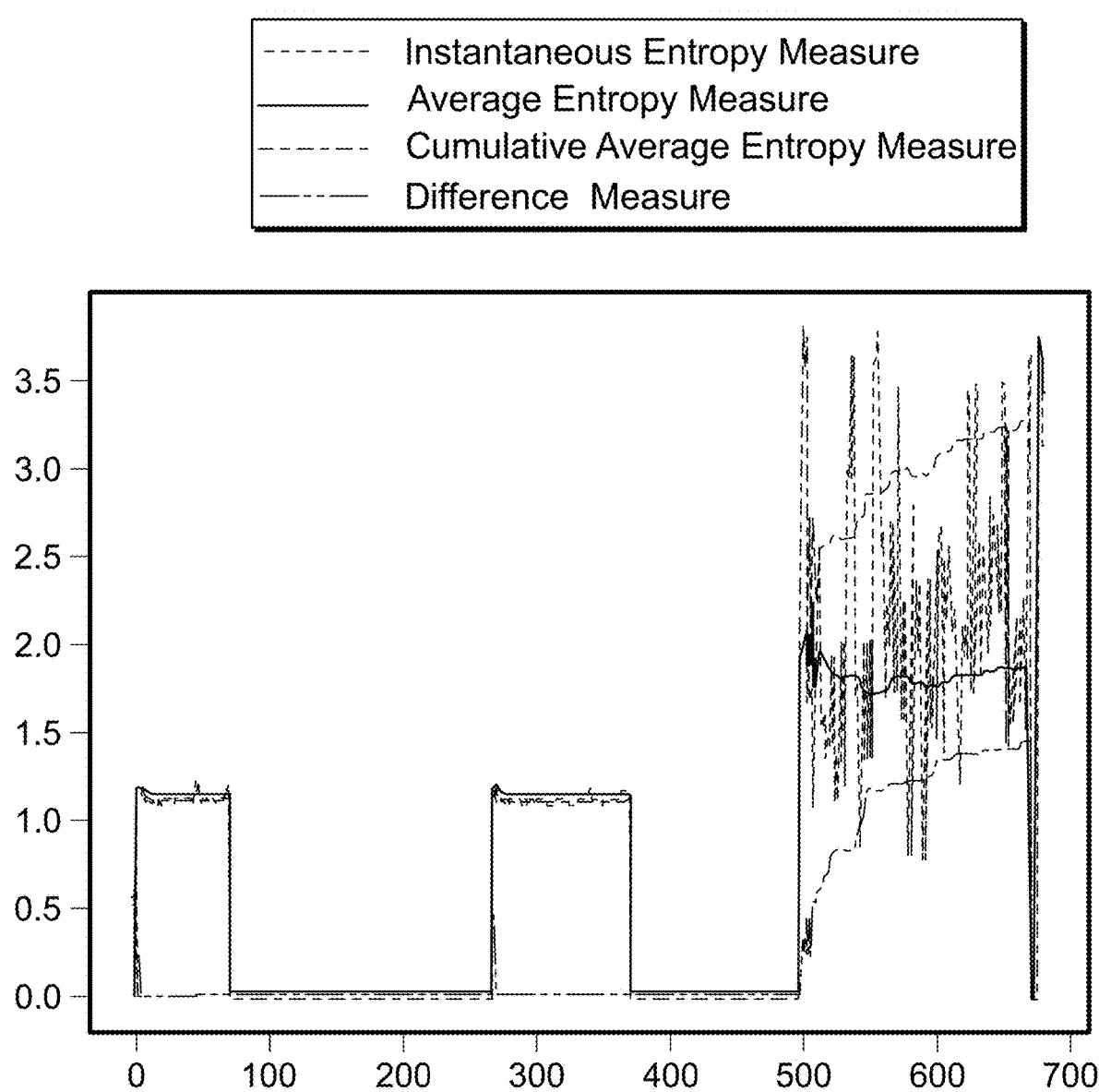
FIG. 10 is a graph of three entropy measures for an audio signal during tone and speech.

FIG. 9 depicts the instantaneous entropy measure, the average entropy measure $\overline{H(X)}$, the cumulative average entropy measure $H(\overline{X})$, and the difference $D(t)=\overline{H(X_t)}-H(\overline{X}_t)$ for the same exemplary degraded tone signal under analysis. The difference measure D (t) used to differentiate between tone and speech substantially improves the audio classification. Even if the values of the average entropy measure $\overline{H(X)}$ and the cumulative average spectral measure $H(\overline{X})$ vary during degraded tones, the difference measure D(t) remains relatively low. In fact, as depicted in FIG. 9, the difference measure D (t) is near zero during tones (degraded or not), indicating that the part of the audio signal currently under analysis is most likely tone. By way of comparison, FIG. 10 depicts the same measures when analyzing a signal with both tone and speech. As shown, the difference measure D (t) varies when the audio signal is speech (right-hand side of FIG. 10) but remains near zero during tones (two audio signals on left-hand side of FIG. 10).

To validate the performance and robustness of the improved technology and algorithm (i.e., the new method), a set of audio signals carried over very poor transmission networks were analyzed. More specifically, the audio files used to evaluate the system robustness were all audio signals from a contact center reported as being problematic. In a first step, 525 files containing mostly tone signals with occasional speech were analyzed using the new method in which the difference measure $D(t)=\overline{H(X_t)}-H(\overline{X}_t)$ is used to make the classification. The same files were also analyzed using a method consisting of combining the Goertzel algorithm with spectral flatness and the average entropy measure $\overline{H(X)}$ to make the classification (i.e., the old method). The files were also analyzed using a trained Nueral Net (NN) model. The results are provided below in Table 3, in which "S-M-T" is indicative of speech marked/classified as tone, "T-M-S"" is indicative of tone marked/classified as speech, and "C-C" is indicative of a correct classification.

TABLE 3

First Comparative Results for Three Different Approaches

|  | S-M-T | T-M-S | C-C |
| --- | --- | --- | --- |
| Old Method | 58 | 11 | 415 |
| Neural Net | 20 | 26 | 438 |
| New Method | 16 | 10 | 458 |

As shown, the new method makes fewer classification errors than the alternative methods, including outperforming the NN model by making almost 20% fewer errors in the case of speech marked as tones and 65% fewer errors in the case of tones marked as speech. Accordingly, it should be appreciated that such results provide substantial confidence in the viability of the new method/technology.

In a second step, 225 files containing mostly speech audio signals with occasional tones were analyzed using the same methods. The results are provided below in Table 4.

TABLE 4

Second Comparative Results for Three Different Approaches

|  | S-M-T | T-M-S | C-C |
| --- | --- | --- | --- |
| Old Method | 82 | 1 | 138 |
| Neural Net | 48 | 1 | 172 |
| New Method | 12 | 2 | 207 |

Accordingly, an analysis of audio signals containing mostly speech with occasional tones yielded similar comparative results, with the new method/technology making fewer classification errors than the other two methods analyzed.

Being able to accurately and efficiently detect when a tone is present in an audio stream is a critical step in a Call Progress Analysis (CPA) system. Given that a signal is representative of a tone, identifying the particular tone (e.g., as a 400 Hz tone or a 679 Hz tone) is typically relatively simple. The methods and technologies described herein involving cumulative average spectral analysis are robust in their ability to differentiate between tones and speech even when encountering degraded audio signals, and therefore will serve to significantly improve the performance of CPA systems worldwide.

It should be appreciated that an audio signal may be received by and/or analyzed by one or more devices of a contact center system (e.g., the contact center system of FIG. 2) using the techniques described herein to differentiate between tones and speech in the audio signal, for example, in order to automatically interpret/process the call. For example, in some embodiments, the initiator of the call (e.g., an automated outbound dialer system) is interested in knowing if the line is busy, if someone answered, etc., in order to take the next appropriate action, such as connecting the outbound call to an agent or automated interactive voice response (IVR) system.

Figure 1B:
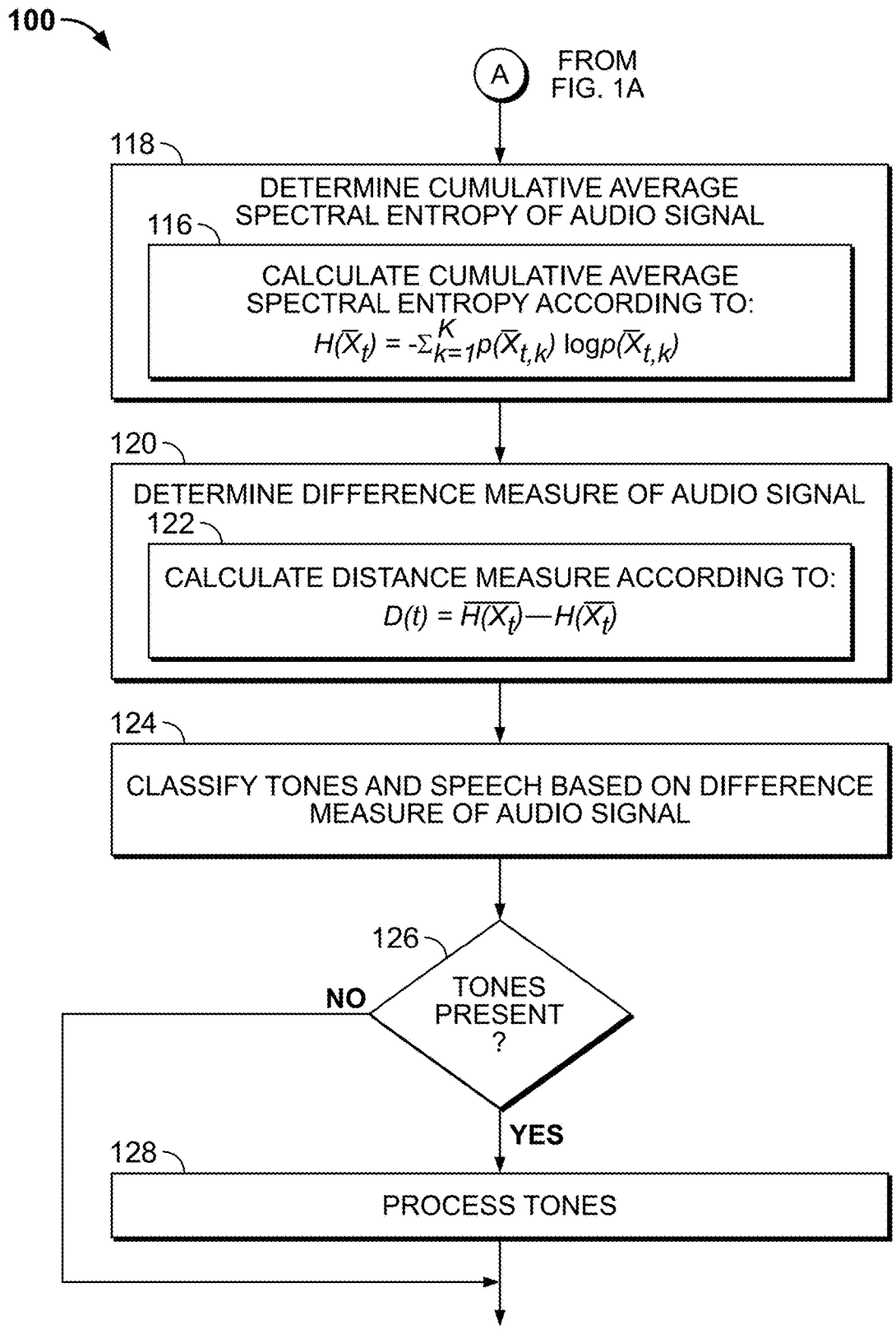

Referring now to FIGS. 1A-1B, in use, a system may execute a method 100 for performing call progress analysis using tone and speech classification. It should be appreciated that, in some embodiments, the system may be embodied as a computing device (e.g., the computing device 300 of FIG. 3) and/or a contact center system (e.g., the contact center system 200 of FIG. 2) or system/device thereof. It should be appreciated that the particular blocks of the method 100 are illustrated by way of example, and such blocks may be combined or divided, added or removed, and/or reordered in whole or in part depending on the particular embodiment, unless stated to the contrary.

The illustrative method 100 begins with block 102 of FIG. 1A in which the system (e.g., the computing device 300 or the contact center system 200) receives an audio signal. In block 104, the system determines the entropy of the received audio signal. In doing so, in block 106, the system may calculate the entropy of the received audio signal according to:

$$H(X) = -\Sigma_{k=1}^{K} p(X_k) \log p(X_k).$$

In block 108, the system determines the cumulative average of the entropy of the audio signal. In doing so, in block 110, the system may calculate the cumulative average of the entropy of the audio signal according to:

$$\overline{H(X_t)} = \begin{cases} \dfrac{\sum_{i=t_b}^{t} H(X_i)}{t-t_b} & \text{if audio signal is active} \\ 0 & \text{if audio signal is inactive} \end{cases}$$

In block 112, the system determines the cumulative average power spectral amplitude of the audio signal. In doing so, in block 114, the system may calculate the cumulative average power spectral amplitude of the audio signal according to:

$$\overline{X_t} = \begin{cases} \dfrac{\sum_{i=t_b}^{t} X_i}{t-t_b} & \text{if audio signal is active} \\ 0 & \text{if audio signal is inactive} \end{cases}$$

In block 116 of FIG. 1B, the system determines the cumulative average spectral entropy of the audio signal based on the cumulative average power spectral amplitude of the audio signal. In doing so, in block 118, the system may calculate the cumulative average spectral entropy of the audio signal according to:

$$H(\overline{X_t}) = -\sum_{k=1}^{K} p(\overline{X}_{t,k}) \log p(\overline{X}_{t,k}).$$

In block 120, the system determines a difference measure of the audio signal as a difference between the cumulative average of the entropy of the audio signal and the cumulative average spectral entropy of the audio signal. In doing so, in block 122, the system may calculate the difference measure of the audio signal according to:

$$D(t) = \overline{H(X_t)} - H(\overline{X_t}).$$

In block 124, the system classifies tones and speech based on the difference measure of the audio signal. For example, as described above, the difference measure may be near or approximately zero during tones, indicating that the portion of the audio signal under analysis (e.g., the frequency range) likely corresponds with a tone if the difference measure is approximately zero. Accordingly, in some embodiments, the system may utilize one or more thresholds to distinguish tone and speech portions of the audio signal. In particular, the system may identify portions of the audio signal below a predefined threshold to be tone portions of the audio signals and portions of the audio signal above (or at least) the predefined threshold to be speech portions of the audio signal. In other embodiments, it should be appreciated that the system may otherwise distinguish/classify tones and speech based on the difference measure of the audio signal.

In block 126, the system determines whether one or more tones were identified in the audio signal. If so, the method 100 advances to block 128 in which the system processes (or attempts to process) the one or more tones. Otherwise, the method 100 may terminate. In circumstances in which tones are identified in the audio signal, it should be appreciated that the identified tones may be, or may include, one or more call progress tone patterns. For example, in some embodiments, the tones may include or represent a busy signal pattern, a ring back pattern, or a special information tone (SIT) pattern. It should be appreciated that the system may process the one or more tones using any suitable technique and/or algorithm such as by determining the corresponding frequency of each of the tones identified in the audio signal. For example, in some embodiments, the system may identify a call progress tone pattern in the one or more tones of the audio signal and transfer a telephonic call to another entity. In particular, in the context of a contact center system, the telephonic call may be transferred from a first system of the contact center system to a second system of the contact center system. In another embodiment, the processing of the tones of the audio signal (e.g., a call progress tone pattern) may involve connecting an outbound call to an agent or an automated interaction voice response (IVR) system of the contact center system.

Although the blocks 102-128 are described in a relatively serial manner, it should be appreciated that various blocks of the method 100 may be performed in parallel in some embodiments.

Figure 2:
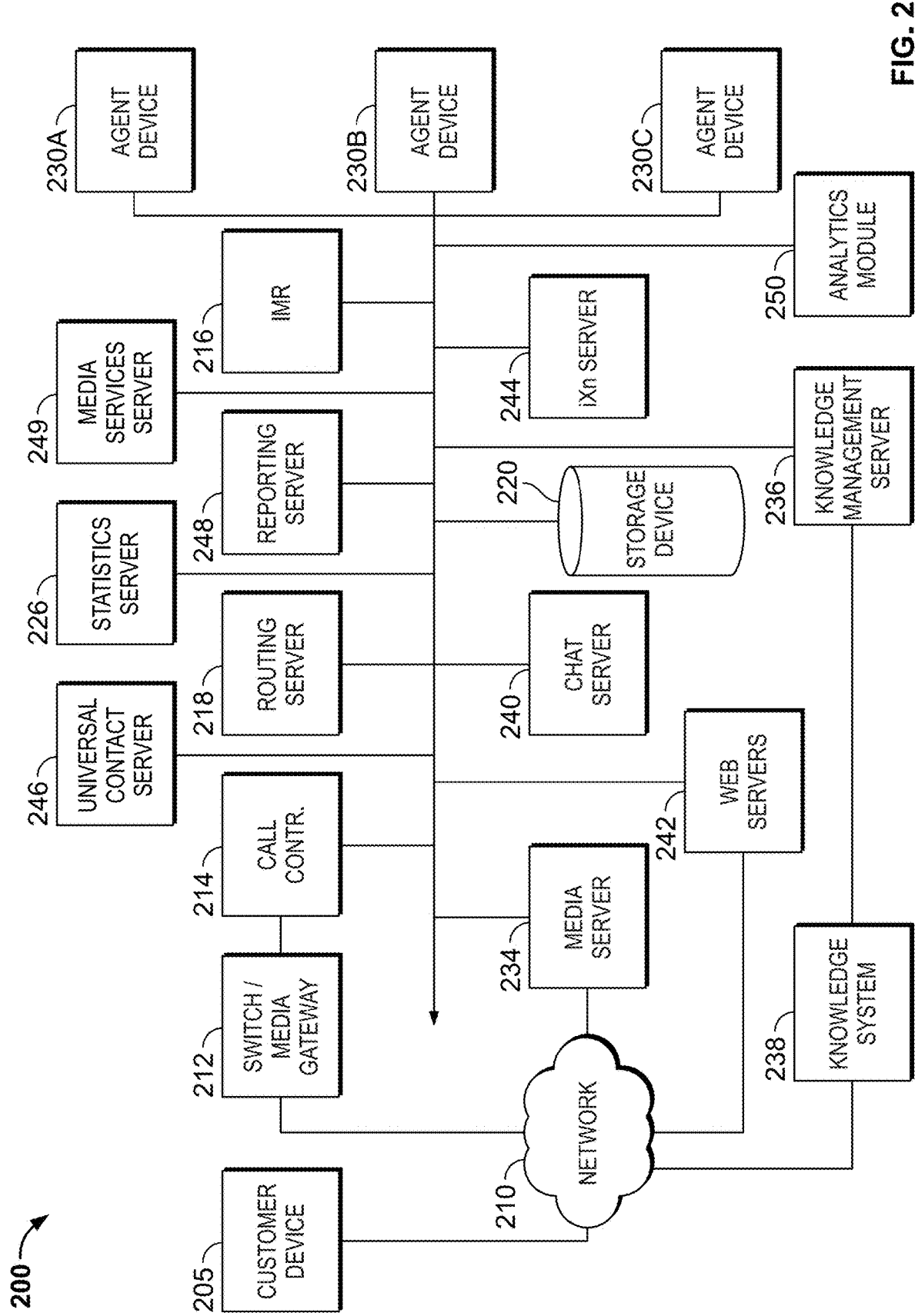
FIG. 2 is a simplified block diagram of at least one embodiment of a call center system.

Referring now to FIG. 2, a simplified block diagram of at least one embodiment of a communications infrastructure and/or content center system, which may be used in conjunction with one or more of the embodiments described herein, is shown. The contact center system 200 may be embodied as any system capable of providing contact center services (e.g., call center services, chat center services, SMS center services, etc.) to an end user and otherwise performing the functions described herein. The illustrative contact center system 200 includes a customer device 205, a network 210, a switch/media gateway 212, a call controller 214, an interactive media response (IMR) server 216, a routing server 218, a storage device 220, a statistics server 226, agent devices 230A, 230B, 230C, a media server 234, a knowledge management server 236, a knowledge system 238, chat server 240, web servers 242, an interaction (iXn) server 244, a universal contact server 246, a reporting server 248, a media services server 249, and an analytics module 250. Although only one customer device 205, one network 210, one switch/media gateway 212, one call controller 214, one IMR server 216, one routing server 218, one storage device 220, one statistics server 226, one media server 234, one knowledge management server 236, one knowledge system 238, one chat server 240, one iXn server 244, one universal contact server 246, one reporting server 248, one media services server 249, and one analytics module 250 are shown in the illustrative embodiment of FIG. 2, the contact center system 200 may include multiple customer devices 205, networks 210, switch/media gateways 212, call controllers 214, IMR servers 216, routing servers 218, storage devices 220, statistics servers 226, media servers 234, knowledge management servers 236, knowledge systems 238, chat servers 240, iXn servers 244, universal contact servers 246, reporting servers 248, media services servers 249, and/or analytics modules 250 in other embodiments. Further, in some embodiments, one or more of the components described herein may be excluded from the system 200, one or more of the components described as being independent may form a portion of another component, and/or one or more of the component described as forming a portion of another component may be independent.

It should be understood that the term "contact center system" is used herein to refer to the system depicted in FIG. 2 and/or the components thereof, while the term "contact center" is used more generally to refer to contact center systems, customer service providers operating those systems, and/or the organizations or enterprises associated therewith. Thus, unless otherwise specifically limited, the term "contact center" refers generally to a contact center system (such as the contact center system 200), the associated customer service provider (such as a particular customer service provider providing customer services through the contact center system 200), as well as the organization or enterprise on behalf of which those customer services are being provided.

By way of background, customer service providers may offer many types of services through contact centers. Such contact centers may be staffed with employees or customer service agents (or simply "agents"), with the agents serving as an interface between a company, enterprise, government agency, or organization (hereinafter referred to interchangeably as an "organization" or "enterprise") and persons, such as users, individuals, or customers (hereinafter referred to interchangeably as "individuals" or "customers"). For example, the agents at a contact center may assist customers in making purchasing decisions, receiving orders, or solving problems with products or services already received. Within a contact center, such interactions between contact center agents and outside entities or customers may be conducted over a variety of communication channels, such as, for example, via voice (e.g., telephone calls or voice over IP or VoIP calls), video (e.g., video conferencing), text (e.g., emails and text chat), screen sharing, co-browsing, and/or other communication channels.

Operationally, contact centers generally strive to provide quality services to customers while minimizing costs. For example, one way for a contact center to operate is to handle every customer interaction with a live agent. While this approach may score well in terms of the service quality, it likely would also be prohibitively expensive due to the high cost of agent labor. Because of this, most contact centers utilize some level of automated processes in place of live agents, such as, for example, interactive voice response (IVR) systems, interactive media response (IMR) systems, internet robots or "bots", automated chat modules or "chatbots", and/or other automated processed. In many cases, this has proven to be a successful strategy, as automated processes can be highly efficient in handling certain types of interactions and effective at decreasing the need for live agents. Such automation allows contact centers to target the use of human agents for the more difficult customer interactions, while the automated processes handle the more repetitive or routine tasks. Further, automated processes can be structured in a way that optimizes efficiency and promotes repeatability. Whereas a human or live agent may forget to ask certain questions or follow-up on particular details, such mistakes are typically avoided through the use of automated processes. While customer service providers are increasingly relying on automated processes to interact with customers, the use of such technologies by customers remains far less developed. Thus, while IVR systems, IMR systems, and/or bots are used to automate portions of the interaction on the contact center-side of an interaction, the actions on the customer-side remain for the customer to perform manually.

It should be appreciated that the contact center system 200 may be used by a customer service provider to provide various types of services to customers. For example, the contact center system 200 may be used to engage and manage interactions in which automated processes (or bots) or human agents communicate with customers. As should be understood, the contact center system 200 may be an in-house facility to a business or enterprise for performing the functions of sales and customer service relative to products and services available through the enterprise. In another embodiment, the contact center system 200 may be operated by a third-party service provider that contracts to provide services for another organization. Further, the contact center system 200 may be deployed on equipment dedicated to the enterprise or third-party service provider, and/or deployed in a remote computing environment such as, for example, a private or public cloud environment with infrastructure for supporting multiple contact centers for multiple enterprises. The contact center system 200 may include software applications or programs, which may be executed on premises or remotely or some combination thereof. It should further be appreciated that the various components of the contact center system 200 may be distributed across various geographic locations and not necessarily contained in a single location or computing environment.

It should further be understood that, unless otherwise specifically limited, any of the computing elements of the present invention may be implemented in cloud-based or cloud computing environments. As used herein and further described below in reference to the computing device 300, "cloud computing"—or, simply, the "cloud"—is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. Cloud computing can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Often referred to as a "serverless architecture", a cloud execution model generally includes a service provider dynamically managing an allocation and provisioning of remote servers for achieving a desired functionality.

Figure 3:
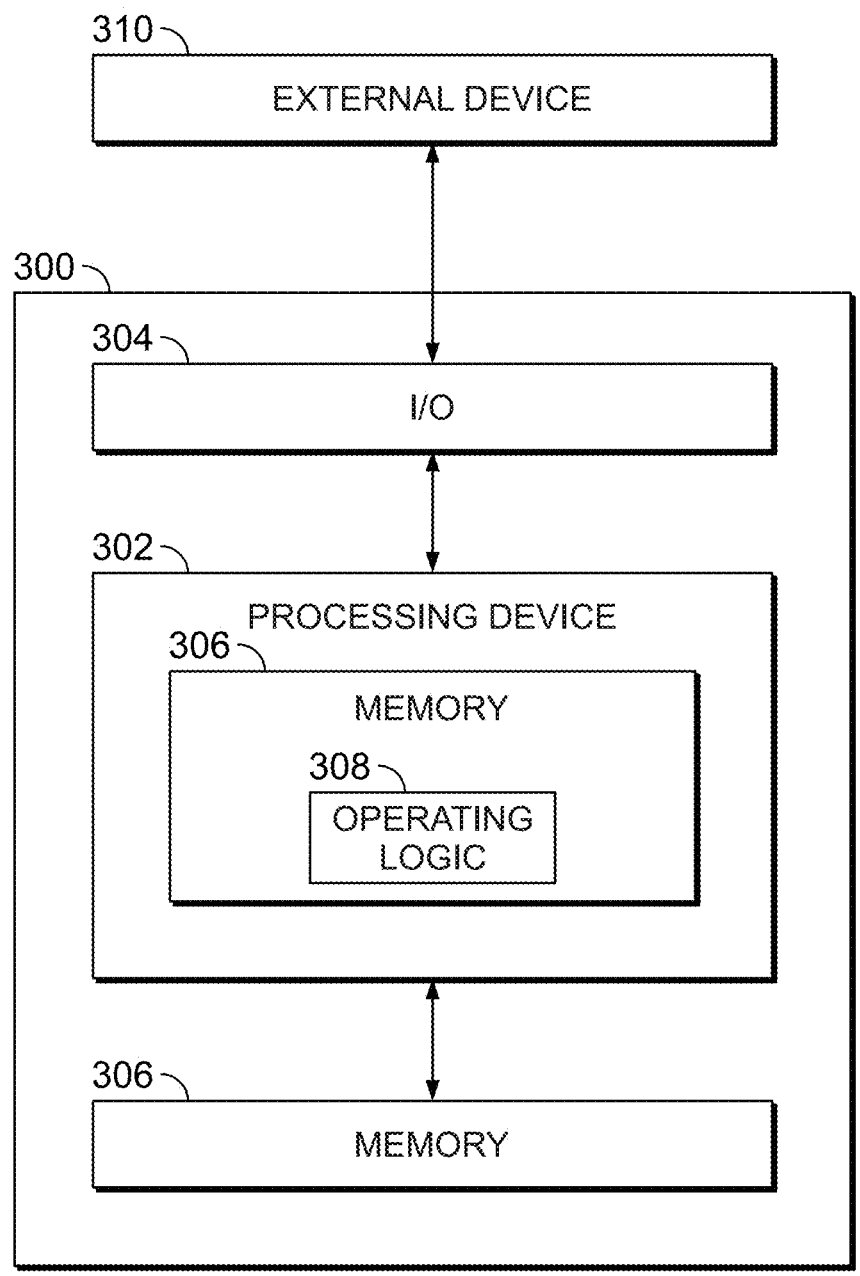
FIG. 3 is a simplified block diagram of at least one embodiment of a computing system.

It should be understood that any of the computer-implemented components, modules, or servers described in relation to FIG. 2 may be implemented via one or more types of computing devices, such as, for example, the computing device 300 of FIG. 3. As will be seen, the contact center system 200 generally manages resources (e.g., personnel, computers, telecommunication equipment, etc.) to enable delivery of services via telephone, email, chat, or other communication mechanisms. Such services may vary depending on the type of contact center and, for example, may include customer service, help desk functionality, emergency response, telemarketing, order taking, and/or other characteristics.

Customers desiring to receive services from the contact center system 200 may initiate inbound communications (e.g., telephone calls, emails, chats, etc.) to the contact center system 200 via a customer device 205. While FIG. 2 shows one such customer device—i.e., customer devices 205—it should be understood that any number of customer devices 205 may be present. The customer devices 205, for example, may be a communication device, such as a telephone, smart phone, computer, tablet, or laptop. In accordance with functionality described herein, customers may generally use the customer devices 205 to initiate, manage, and conduct communications with the contact center system 200, such as telephone calls, emails, chats, text messages, web-browsing sessions, and other multi-media transactions.

Inbound and outbound communications from and to the customer devices 205 may traverse the network 210, with the nature of the network typically depending on the type of customer device being used and the form of communication. As an example, the network 210 may include a communication network of telephone, cellular, and/or data services. The network 210 may be a private or public switched telephone network (PSTN), local area network (LAN), private wide area network (WAN), and/or public WAN such as the Internet. Further, the network 210 may include a wireless carrier network including a code division multiple access (CDMA) network, global system for mobile communications (GSM) network, or any wireless network/technology conventional in the art, including but not limited to 3G, 4G, LTE, 5G, etc.

The switch/media gateway 212 may be coupled to the network 210 for receiving and transmitting telephone calls between customers and the contact center system 200. The switch/media gateway 212 may include a telephone or communication switch configured to function as a central switch for agent level routing within the center. The switch may be a hardware switching system or implemented via software. For example, the switch 212 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, one of the agent devices 230. Thus, in general, the switch/media gateway 212 establishes a voice connection between the customer and the agent by establishing a connection between the customer device 205 and agent device 230.

As further shown, the switch/media gateway 212 may be coupled to the call controller 214 which, for example, serves as an adapter or interface between the switch and the other routing, monitoring, and communication-handling components of the contact center system 200. The call controller 214 may be configured to process PSTN calls, VoIP calls, and/or other types of calls. For example, the call controller 214 may include computer-telephone integration (CTI) software for interfacing with the switch/media gateway and other components. The call controller 214 may include a session initiation protocol (SIP) server for processing SIP calls. The call controller 214 may also extract data about an incoming interaction, such as the customer's telephone number, IP address, or email address, and then communicate these with other contact center components in processing the interaction.

The interactive media response (IMR) server 216 may be configured to enable self-help or virtual assistant functionality. Specifically, the IMR server 216 may be similar to an interactive voice response (IVR) server, except that the IMR server 216 is not restricted to voice and may also cover a variety of media channels. In an example illustrating voice, the IMR server 216 may be configured with an IMR script for querying customers on their needs. For example, a contact center for a bank may instruct customers via the IMR script to "press 1" if they wish to retrieve their account balance. Through continued interaction with the IMR server 216, customers may receive service without needing to speak with an agent. The IMR server 216 may also be configured to ascertain why a customer is contacting the contact center so that the communication may be routed to the appropriate resource. The IMR configuration may be performed through the use of a self-service and/or assisted service tool which comprises a web-based tool for developing IVR applications and routing applications running in the contact center environment (e.g. Genesys® Designer).

The routing server 218 may function to route incoming interactions. For example, once it is determined that an inbound communication should be handled by a human agent, functionality within the routing server 218 may select the most appropriate agent and route the communication thereto. This agent selection may be based on which available agent is best suited for handling the communication. More specifically, the selection of appropriate agent may be based on a routing strategy or algorithm that is implemented by the routing server 218. In doing this, the routing server 218 may query data that is relevant to the incoming interaction, for example, data relating to the particular customer, available agents, and the type of interaction, which, as described herein, may be stored in particular databases. Once the agent is selected, the routing server 218 may interact with the call controller 214 to route (i.e., connect) the incoming interaction to the corresponding agent device 230. As part of this connection, information about the customer may be provided to the selected agent via their agent device 230. This information is intended to enhance the service the agent is able to provide to the customer.

It should be appreciated that the contact center system 200 may include one or more mass storage devices—represented generally by the storage device 220—for storing data in one or more databases relevant to the functioning of the contact center. For example, the storage device 220 may store customer data that is maintained in a customer database. Such customer data may include, for example, customer profiles, contact information, service level agreement (SLA), and interaction history (e.g., details of previous interactions with a particular customer, including the nature of previous interactions, disposition data, wait time, handle time, and actions taken by the contact center to resolve customer issues). As another example, the storage device 220 may store agent data in an agent database. Agent data maintained by the contact center system 200 may include, for example, agent availability and agent profiles, schedules, skills, handle time, and/or other relevant data. As another example, the storage device 220 may store interaction data in an interaction database. Interaction data may include, for example, data relating to numerous past interactions between customers and contact centers. More generally, it should be understood that, unless otherwise specified, the storage device 220 may be configured to include databases and/or store data related to any of the types of information described herein, with those databases and/or data being accessible to the other modules or servers of the contact center system 200 in ways that facilitate the functionality described herein. For example, the servers or modules of the contact center system 200 may query such databases to retrieve data stored therein or transmit data thereto for storage. The storage device 220, for example, may take the form of any conventional storage medium and may be locally housed or operated from a remote location. As an example, the databases may be Cassandra database, NoSQL database, or a SQL database and managed by a database management system, such as, Oracle, IBM DB2, Microsoft SQL server, or Microsoft Access, PostgreSQL.

The statistics server 226 may be configured to record and aggregate data relating to the performance and operational aspects of the contact center system 200. Such information may be compiled by the statistics server 226 and made available to other servers and modules, such as the reporting server 248, which then may use the data to produce reports that are used to manage operational aspects of the contact center and execute automated actions in accordance with functionality described herein. Such data may relate to the state of contact center resources, e.g., average wait time, abandonment rate, agent occupancy, and others as functionality described herein would require.

The agent devices 230 of the contact center system 200 may be communication devices configured to interact with the various components and modules of the contact center system 200 in ways that facilitate functionality described herein. An agent device 230, for example, may include a telephone adapted for regular telephone calls or VoIP calls. An agent device 230 may further include a computing device configured to communicate with the servers of the contact center system 200, perform data processing associated with operations, and interface with customers via voice, chat, email, and other multimedia communication mechanisms according to functionality described herein. Although FIG. 2 shows three such agent devices 230—i.e., agent devices 230A, 230B and 230C—it should be understood that any number of agent devices 230 may be present in a particular embodiment.

The multimedia/social media server 234 may be configured to facilitate media interactions (other than voice) with the customer devices 205 and/or the servers 242. Such media interactions may be related, for example, to email, voice mail, chat, video, text-messaging, web, social media, co-browsing, etc. The multi-media/social media server 234 may take the form of any IP router conventional in the art with specialized hardware and software for receiving, processing, and forwarding multi-media events and communications.

The knowledge management server 236 may be configured to facilitate interactions between customers and the knowledge system 238. In general, the knowledge system 238 may be a computer system capable of receiving questions or queries and providing answers in response. The knowledge system 238 may be included as part of the contact center system 200 or operated remotely by a third party. The knowledge system 238 may include an artificially intelligent computer system capable of answering questions posed in natural language by retrieving information from information sources such as encyclopedias, dictionaries, newswire articles, literary works, or other documents submitted to the knowledge system 238 as reference materials. As an example, the knowledge system 238 may be embodied as IBM Watson or a similar system.

The chat server 240, it may be configured to conduct, orchestrate, and manage electronic chat communications with customers. In general, the chat server 240 is configured to implement and maintain chat conversations and generate chat transcripts. Such chat communications may be conducted by the chat server 240 in such a way that a customer communicates with automated chatbots, human agents, or both. In exemplary embodiments, the chat server 240 may perform as a chat orchestration server that dispatches chat conversations among the chatbots and available human agents. In such cases, the processing logic of the chat server 240 may be rules driven so to leverage an intelligent workload distribution among available chat resources. The chat server 240 further may implement, manage, and facilitate user interfaces (UIs) associated with the chat feature, including those UIs generated at either the customer device 205 or the agent device 230. The chat server 240 may be configured to transfer chats within a single chat session with a particular customer between automated and human sources such that, for example, a chat session transfers from a chatbot to a human agent or from a human agent to a chatbot. The chat server 240 may also be coupled to the knowledge management server 236 and the knowledge systems 238 for receiving suggestions and answers to queries posed by customers during a chat so that, for example, links to relevant articles can be provided.

The web servers 242 may be included to provide site hosts for a variety of social interaction sites to which customers subscribe, such as Facebook, Twitter, Instagram, etc. Though depicted as part of the contact center system 200, it should be understood that the web servers 242 may be provided by third parties and/or maintained remotely. The web servers 242 may also provide webpages for the enterprise or organization being supported by the contact center system 200. For example, customers may browse the webpages and receive information about the products and services of a particular enterprise. Within such enterprise webpages, mechanisms may be provided for initiating an interaction with the contact center system 200, for example, via web chat, voice, or email. An example of such a mechanism is a widget, which can be deployed on the webpages or websites hosted on the web servers 242. As used herein, a widget refers to a user interface component that performs a particular function. In some implementations, a widget may include a graphical user interface control that can be overlaid on a webpage displayed to a customer via the Internet. The widget may show information, such as in a window or text box, or include buttons or other controls that allow the customer to access certain functionalities, such as sharing or opening a file or initiating a communication. In some implementations, a widget includes a user interface component having a portable portion of code that can be installed and executed within a separate webpage without compilation. Some widgets can include corresponding or additional user interfaces and be configured to access a variety of local resources (e.g., a calendar or contact information on the customer device) or remote resources via network (e.g., instant messaging, electronic mail, or social networking updates).

The interaction (iXn) server 244 may be configured to manage deferrable activities of the contact center and the routing thereof to human agents for completion. As used herein, deferrable activities may include back-office work that can be performed off-line, e.g., responding to emails, attending training, and other activities that do not entail real-time communication with a customer. As an example, the interaction (iXn) server 244 may be configured to interact with the routing server 218 for selecting an appropriate agent to handle each of the deferrable activities. Once assigned to a particular agent, the deferrable activity is pushed to that agent so that it appears on the agent device 230 of the selected agent. The deferrable activity may appear in a workbin as a task for the selected agent to complete. The functionality of the workbin may be implemented via any conventional data structure, such as, for example, a linked list, array, and/or other suitable data structure. Each of the agent devices 230 may include a workbin. As an example, a workbin may be maintained in the buffer memory of the corresponding agent device 230.

The universal contact server (UCS) 246 may be configured to retrieve information stored in the customer database and/or transmit information thereto for storage therein. For example, the UCS 246 may be utilized as part of the chat feature to facilitate maintaining a history on how chats with a particular customer were handled, which then may be used as a reference for how future chats should be handled. More generally, the UCS 246 may be configured to facilitate maintaining a history of customer preferences, such as preferred media channels and best times to contact. To do this, the UCS 246 may be configured to identify data pertinent to the interaction history for each customer such as, for example, data related to comments from agents, customer communication history, and the like. Each of these data types then may be stored in the customer database 222 or on other modules and retrieved as functionality described herein requires.

The reporting server 248 may be configured to generate reports from data compiled and aggregated by the statistics server 226 or other sources. Such reports may include near real-time reports or historical reports and concern the state of contact center resources and performance characteristics, such as, for example, average wait time, abandonment rate, and/or agent occupancy. The reports may be generated automatically or in response to specific requests from a requestor (e.g., agent, administrator, contact center application, etc.). The reports then may be used toward managing the contact center operations in accordance with functionality described herein.

The media services server 249 may be configured to provide audio and/or video services to support contact center features. In accordance with functionality described herein, such features may include prompts for an IVR or IMR system (e.g., playback of audio files), hold music, voicemails/single party recordings, multi-party recordings (e.g., of audio and/or video calls), speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, keyword spotting, and/or other relevant features.

The analytics module 250 may be configured to provide systems and methods for performing analytics on data received from a plurality of different data sources as functionality described herein may require. In accordance with example embodiments, the analytics module 250 also may generate, update, train, and modify predictors or models based on collected data, such as, for example, customer data, agent data, and interaction data. The models may include behavior models of customers or agents. The behavior models may be used to predict behaviors of, for example, customers or agents, in a variety of situations, thereby allowing embodiments of the present invention to tailor interactions based on such predictions or to allocate resources in preparation for predicted characteristics of future interactions, thereby improving overall contact center performance and the customer experience. It will be appreciated that, while the analytics module is described as being part of a contact center, such behavior models also may be implemented on customer systems (or, as also used herein, on the "customer-side" of the interaction) and used for the benefit of customers.

According to exemplary embodiments, the analytics module 250 may have access to the data stored in the storage device 220, including the customer database and agent database. The analytics module 250 also may have access to the interaction database, which stores data related to interactions and interaction content (e.g., transcripts of the interactions and events detected therein), interaction metadata (e.g., customer identifier, agent identifier, medium of interaction, length of interaction, interaction start and end time, department, tagged categories), and the application setting (e.g., the interaction path through the contact center). Further, the analytic module 250 may be configured to retrieve data stored within the storage device 220 for use in developing and training algorithms and models, for example, by applying machine learning techniques.

One or more of the included models may be configured to predict customer or agent behavior and/or aspects related to contact center operation and performance. Further, one or more of the models may be used in natural language processing and, for example, include intent recognition and the like. The models may be developed based upon known first principle equations describing a system; data, resulting in an empirical model; or a combination of known first principle equations and data. In developing a model for use with present embodiments, because first principles equations are often not available or easily derived, it may be generally preferred to build an empirical model based upon collected and stored data. To properly capture the relationship between the manipulated/disturbance variables and the controlled variables of complex systems, in some embodiments, it may be preferable that the models are nonlinear. This is because nonlinear models can represent curved rather than straight-line relationships between manipulated/disturbance variables and controlled variables, which are common to complex systems such as those discussed herein. Given the foregoing requirements, a machine learning or neural network-based approach may be a preferred embodiment for implementing the models. Neural networks, for example, may be developed based upon empirical data using advanced regression algorithms.

The analytics module 250 may further include an optimizer. As will be appreciated, an optimizer may be used to minimize a "cost function" subject to a set of constraints, where the cost function is a mathematical representation of desired objectives or system operation. Because the models may be non-linear, the optimizer may be a nonlinear programming optimizer. It is contemplated, however, that the technologies described herein may be implemented by using, individually or in combination, a variety of different types of optimization approaches, including, but not limited to, linear programming, quadratic programming, mixed integer non-linear programming, stochastic programming, global non-linear programming, genetic algorithms, particle/swarm techniques, and the like.

According to some embodiments, the models and the optimizer may together be used within an optimization system. For example, the analytics module 250 may utilize the optimization system as part of an optimization process by which aspects of contact center performance and operation are optimized or, at least, enhanced. This, for example, may include features related to the customer experience, agent experience, interaction routing, natural language processing, intent recognition, or other functionality related to automated processes.

The various components, modules, and/or servers of FIG. 2 (as well as the other figures included herein) may each include one or more processors executing computer program instructions and interacting with other system components for performing the various functionalities described herein. Such computer program instructions may be stored in a memory implemented using a standard memory device, such as, for example, a random-access memory (RAM), or stored in other non-transitory computer readable media such as, for example, a CD-ROM, flash drive, etc. Although the functionality of each of the servers is described as being provided by the particular server, a person of skill in the art should recognize that the functionality of various servers may be combined or integrated into a single server, or the functionality of a particular server may be distributed across one or more other servers without departing from the scope of the present invention. Further, the terms "interaction" and "communication" are used interchangeably, and generally refer to any real-time and non-real-time interaction that uses any communication channel including, without limitation, telephone calls (PSTN or VoIP calls), emails, vmails, video, chat, screen-sharing, text messages, social media messages, WebRTC calls, etc. Access to and control of the components of the contact center system 200 may be affected through user interfaces (UIs) which may be generated on the customer devices 205 and/or the agent devices 230. As already noted, the contact center system 200 may operate as a hybrid system in which some or all components are hosted remotely, such as in a cloud-based or cloud computing environment. It should be appreciated that each of the devices of the contact center system 200 may be embodied as, include, or form a portion of one or more computing devices similar to the computing device 300 described below in reference to FIG. 3.

Referring now to FIG. 3, a simplified block diagram of at least one embodiment of a computing device 300 is shown. The illustrative computing device 300 depicts at least one embodiment of each of the computing devices, systems, servicers, controllers, switches, gateways, engines, modules, and/or computing components described herein (e.g., which collectively may be referred to interchangeably as computing devices, servers, or modules for brevity of the description). For example, the various computing devices may be a process or thread running on one or more processors of one or more computing devices 300, which may be executing computer program instructions and interacting with other system modules in order to perform the various functionalities described herein. Unless otherwise specifically limited, the functionality described in relation to a plurality of computing devices may be integrated into a single computing device, or the various functionalities described in relation to a single computing device may be distributed across several computing devices. Further, in relation to the computing systems described herein—such as the contact center system 200 of FIG. 2—the various servers and computer devices thereof may be located on local computing devices 300 (e.g., on-site at the same physical location as the agents of the contact center), remote computing devices 300 (e.g., off-site or in a cloud-based or cloud computing environment, for example, in a remote data center connected via a network), or some combination thereof. In some embodiments, functionality provided by servers located on computing devices off-site may be accessed and provided over a virtual private network (VPN), as if such servers were on-site, or the functionality may be provided using a software as a service (SaaS) accessed over the Internet using various protocols, such as by exchanging data via extensible markup language (XML), JSON, and/or the functionality may be otherwise accessed/leveraged.

In some embodiments, the computing device 300 may be embodied as a server, desktop computer, laptop computer, tablet computer, notebook, netbook, Ultrabook™, cellular phone, mobile computing device, smartphone, wearable computing device, personal digital assistant, Internet of Things (IoT) device, processing system, wireless access point, router, gateway, and/or any other computing, processing, and/or communication device capable of performing the functions described herein.

The computing device 300 includes a processing device 302 that executes algorithms and/or processes data in accordance with operating logic 308, an input/output device 304 that enables communication between the computing device 300 and one or more external devices 310, and memory 306 which stores, for example, data received from the external device 310 via the input/output device 304.

The input/output device 304 allows the computing device 300 to communicate with the external device 310. For example, the input/output device 304 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry of the computing device 300 may be configured to use any one or more communication technologies (e.g., wireless or wired communications) and associated protocols (e.g., Ethernet, Bluetooth®, Wi-Fi®, WiMAX, etc.) to effect such communication depending on the particular computing device 300. The input/output device 304 may include hardware, software, and/or firmware suitable for performing the techniques described herein.

The external device 310 may be any type of device that allows data to be inputted or outputted from the computing device 300. For example, in various embodiments, the external device 310 may be embodied as one or more of the devices/systems described herein, and/or a portion thereof. Further, in some embodiments, the external device 310 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 310 may be integrated into the computing device 300.

The processing device 302 may be embodied as any type of processor(s) capable of performing the functions described herein. In particular, the processing device 302 may be embodied as one or more single or multi-core processors, microcontrollers, or other processor or processing/controlling circuits. For example, in some embodiments, the processing device 302 may include or be embodied as an arithmetic logic unit (ALU), central processing unit (CPU), digital signal processor (DSP), graphics processing unit (GPU), field-programmable gate array (FPGA), application-specific integrated circuit (ASIC), and/or another suitable processor(s). The processing device 302 may be a programmable type, a dedicated hardwired state machine, or a combination thereof. Processing devices 302 with multiple processing units may utilize distributed, pipelined, and/or parallel processing in various embodiments. Further, the processing device 302 may be dedicated to performance of just the operations described herein, or may be utilized in one or more additional applications. In the illustrative embodiment, the processing device 302 is programmable and executes algorithms and/or processes data in accordance with operating logic 308 as defined by programming instructions (such as software or firmware) stored in memory 306. Additionally or alternatively, the operating logic 308 for processing device 302 may be at least partially defined by hardwired logic or other hardware. Further, the processing device 302 may include one or more components of any type suitable to process the signals received from input/output device 304 or from other components or devices and to provide desired output signals. Such components may include digital circuitry, analog circuitry, or a combination thereof.

The memory 306 may be of one or more types of non-transitory computer-readable media, such as a solidstate memory, electromagnetic memory, optical memory, or a combination thereof. Furthermore, the memory 306 may be volatile and/or nonvolatile and, in some embodiments, some or all of the memory 306 may be of a portable type, such as a disk, tape, memory stick, cartridge, and/or other suitable portable memory. In operation, the memory 306 may store various data and software used during operation of the computing device 300 such as operating systems, applications, programs, libraries, and drivers. It should be appreciated that the memory 306 may store data that is manipulated by the operating logic 308 of processing device 302, such as, for example, data representative of signals received from and/or sent to the input/output device 304 in addition to or in lieu of storing programming instructions defining operating logic 308. As shown in FIG. 3, the memory 306 may be included with the processing device 302 and/or coupled to the processing device 302 depending on the particular embodiment. For example, in some embodiments, the processing device 302, the memory 306, and/or other components of the computing device 300 may form a portion of a system-on-a-chip (SoC) and be incorporated on a single integrated circuit chip.

In some embodiments, various components of the computing device 300 (e.g., the processing device 302 and the memory 306) may be communicatively coupled via an input/output subsystem, which may be embodied as circuitry and/or components to facilitate input/output operations with the processing device 302, the memory 306, and other components of the computing device 300. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 300 may include other or additional components, such as those commonly found in a typical computing device (e.g., various input/output devices and/or other components), in other embodiments. It should be further appreciated that one or more of the components of the computing device 300 described herein may be distributed across multiple computing devices. In other words, the techniques described herein may be employed by a computing system that includes one or more computing devices. Additionally, although only a single processing device 302, I/O device 304, and memory 306 are illustratively shown in FIG. 3, it should be appreciated that a particular computing device 300 may include multiple processing devices 302, I/O devices 304, and/or memories 306 in other embodiments. Further, in some embodiments, more than one external device 310 may be in communication with the computing device 300.

The computing device 300 may be one of a plurality of devices connected by a network or connected to other systems/resources via a network. The network may be embodied as any one or more types of communication networks that are capable of facilitating communication between the various devices communicatively connected via the network. As such, the network may include one or more networks, routers, switches, access points, hubs, computers, client devices, endpoints, nodes, and/or other intervening network devices. For example, the network may be embodied as or otherwise include one or more cellular networks, telephone networks, local or wide area networks, publicly available global networks (e.g., the Internet), ad hoc networks, short-range communication links, or a combination thereof. In some embodiments, the network may include a circuit-switched voice or data network, a packet-switched voice or data network, and/or any other network able to carry voice and/or data. In particular, in some embodiments, the network may include Internet Protocol (IP)-based and/or asynchronous transfer mode (ATM)-based networks. In some embodiments, the network may handle voice traffic (e.g., via a Voice over IP (VOIP) network), web traffic, and/or other network traffic depending on the particular embodiment and/or devices of the system in communication with one another. In various embodiments, the network may include analog or digital wired and wireless networks (e.g., IEEE 802.11 networks, Public Switched Telephone Network (PSTN), Integrated Services Digital Network (ISDN), and Digital Subscriber Line (xDSL)), Third Generation (3G) mobile telecommunications networks, Fourth Generation (4G) mobile telecommunications networks, Fifth Generation (5G) mobile telecommunications networks, a wired Ethernet network, a private network (e.g., such as an intranet), radio, television, cable, satellite, and/or any other delivery or tunneling mechanism for carrying data, or any appropriate combination of such networks. It should be appreciated that the various devices/systems may communicate with one another via different networks depending on the source and/or destination devices/systems.

It should be appreciated that the computing device 300 may communicate with other computing devices 300 via any type of gateway or tunneling protocol such as secure socket layer or transport layer security. The network interface may include a built-in network adapter, such as a network interface card, suitable for interfacing the computing device to any type of network capable of performing the operations described herein. Further, the network environment may be a virtual network environment where the various network components are virtualized. For example, the various machines may be virtual machines implemented as a software-based computer running on a physical machine. The virtual machines may share the same operating system, or, in other embodiments, different operating system may be run on each virtual machine instance. For example, a "hypervisor" type of virtualizing is used where multiple virtual machines run on the same host physical machine, each acting as if it has its own dedicated box. Other types of virtualization may be employed in other embodiments, such as, for example, the network (e.g., via software defined networking) or functions (e.g., via network functions virtualization).

Accordingly, one or more of the computing devices 300 described herein may be embodied as, or form a portion of, one or more cloud-based systems. In cloud-based embodiments, the cloud-based system may be embodied as a server-ambiguous computing solution, for example, that executes a plurality of instructions on-demand, contains logic to execute instructions only when prompted by a particular activity/trigger, and does not consume computing resources when not in use. That is, system may be embodied as a virtual computing environment residing "on" a computing system (e.g., a distributed network of devices) in which various virtual functions (e.g., Lambda functions, Azure functions, Google cloud functions, and/or other suitable virtual functions) may be executed corresponding with the functions of the system described herein. For example, when an event occurs (e.g., data is transferred to the system for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of data is made by a user (e.g., via an appropriate user interface to the system), the appropriate virtual function(s) may be executed to perform the actions before eliminating the instance of the virtual function(s).

What is claimed is:

1. A contact center system for performing call progress analysis using tone and speech classification, the contact center system comprising:
at least one processor; and
at least one memory comprising a plurality of instructions stored thereon that, in response to execution by the at least one processor, causes the contact center system to:
determine a cumulative average of an entropy of an audio signal received by the contact center system;
determine a cumulative average power spectral amplitude of the audio signal and a cumulative average spectral entropy of the audio signal based on the cumulative average power spectral amplitude of the audio signal;
calculate a difference measure of the audio signal as a difference between the cumulative average of the entropy of the audio signal and the cumulative average spectral entropy of the audio signal;
distinguish tones from speech of the audio signal based on the difference measure of the audio signal; and
process one or more tones of the audio signal in response to identification of the one or more tones in the audio signal.

2. The contact center system of claim 1, wherein to process the one or more tones of the audio signal comprises to:
identify a call progress tone pattern in the one or more tones of the audio signal; and
transfer a telephonic call from a first system of the contact center system to a second system of the contact center system in response to identification of the call progress tone pattern in the one or more tones of the audio signal.

3. The contact center system of claim 1, wherein to process the one or more tones of the audio signal comprises to connect an outbound call to an automated interactive voice response (IVR) system of the contact center system.

4. The contact center system of claim 1, wherein to process the one or more tones of the audio signal comprises to connect an outbound call to an agent of the contact center system.

5. The contact center system of claim 1, wherein the one or more tones of the audio signal comprise a call progress tone pattern.

6. The contact center system of claim 1, wherein the call progress tone pattern comprises one of a busy signal pattern, a ring back pattern, or a special information tone pattern.

7. The contact center system of claim 1, wherein to process the one or more tones of the audio signal comprises to determine a corresponding frequency of each of the one or more tones of the audio signal.

8. The contact center system of claim 1, wherein to determine the cumulative average of the entropy of the audio signal comprises to calculate the entropy of the audio signal.

9. One or more non-transitory machine-readable storage media comprising a plurality of instructions stored thereon that, in response to execution by at least one processor, causes a contact center system to:
calculate an entropy of an audio signal received by the contact center system;
calculate a cumulative average of the entropy of the audio signal;
calculate a cumulative average power spectral amplitude of the audio signal;
calculate a cumulative average spectral entropy of the audio signal based on the cumulative average power spectral amplitude of the audio signal;
calculate a difference measure of the audio signal as a difference between the cumulative average of the entropy of the audio signal and the cumulative average spectral entropy of the audio signal;
classify tones and speech of the audio signal based on the difference measure of the audio signal; and
process one or more tones of the audio signal in response to identification of the one or more tones in the audio signal.

10. The one or more non-transitory machine-readable storage media of claim 9, wherein to process the one or more tones of the audio signal comprises to transfer a telephonic call from a first system of the contact center system to a second system of the contact center system in response to identification of a call progress tone pattern in the one or more tones of the audio signal.

11. The one or more non-transitory machine-readable storage media of claim 9, wherein to process the one or more tones of the audio signal comprises to connect an outbound call to an automated interactive voice response (IVR) system of the contact center system.

12. The one or more non-transitory machine-readable storage media of claim 9, wherein to process the one or more tones of the audio signal comprises to connect an outbound call to an agent of the contact center system.

13. The one or more non-transitory machine-readable storage media of claim 9, wherein the one or more tones of the audio signal comprise a call progress tone pattern.

14. The one or more non-transitory machine-readable storage media of claim 9, wherein the call progress tone pattern comprises one of a busy signal pattern, a ring back pattern, or a special information tone pattern.

15. The one or more non-transitory machine-readable storage media of claim 9, wherein to process the one or more tones of the audio signal comprises to determine a corresponding frequency of each of the one or more tones of the audio signal.

16. A method of performing call progress analysis using tone and speech classification in a contact center system, the method comprising:
receiving an audio signal by the contact center system;
determining, by the contact center system, an entropy of the audio signal received by the contact center system;
determining, by the contact center system, a cumulative average of the entropy of the audio signal;
determining, by the contact center system, a cumulative average power spectral amplitude of the audio signal;
determining, by the contact center system, a cumulative average spectral entropy of the audio signal based on the cumulative average power spectral amplitude of the audio signal;
determining, by the contact center system, a difference measure of the audio signal as a difference between the cumulative average of the entropy of the audio signal and the cumulative average spectral entropy of the audio signal;
classifying, by the contact center system, tones and speech of the audio signal based on the difference measure of the audio signal; and processing, by the contact center system, one or more tones of the audio signal in response to identification of the one or more tones in the audio signal.

17. The method of claim 16, wherein processing the one or more tones of the audio signal comprises:

identifying a call progress tone pattern in the one or more tones of the audio signal; and transferring a telephonic call from a first system of the contact center system to a second system of the contact center system in response to identifying call progress tone pattern in the one or more tones of the audio signal.

18. The method of claim 16, wherein processing the one or more tones of the audio signal comprises connecting an outbound call to one of an agent or an automated interactive voice response (IVR) system of the contact center system.

19. The method of claim 16, wherein the one or more tones of the audio signal comprise a call progress tone pattern.

20. The method of claim 16, wherein processing the one or more tones of the audio signal comprises determining a corresponding frequency of each of the one or more tones of the audio signal.

* * * * *